United States Patent
Orthlieb et al.

(10) Patent No.: US 6,708,083 B2
(45) Date of Patent: Mar. 16, 2004

(54) LOW-POWER HOME HEATING OR COOLING SYSTEM

(76) Inventors: Frederick L. Orthlieb, 13 Green Valley Rd., Wallingford, PA (US) 19086; Ari N. Houser, 818 S. $22^{nd}$ St., Arlington, VA (US) 22202; Tushar Anil Parlikar, 143 Albany St., Cambridge, MA (US) 02139; Erik A. Cheever, 413 S. Olive St., Media, PA (US) 19063

( * ) Notice: Subject to any disclaimer, the term of this patent is extended or adjusted under 35 U.S.C. 154(b) by 0 days.

(21) Appl. No.: 10/175,174

(22) Filed: Jun. 19, 2002

(65) Prior Publication Data

US 2003/0014161 A1 Jan. 16, 2003

Related U.S. Application Data

(60) Provisional application No. 60/299,647, filed on Jun. 20, 2001.

(51) Int. Cl.[7] .......... G06F 17/00; G05D 23/00; F24D 3/00
(52) U.S. Cl. .......... 700/276; 237/8 R; 236/46 R
(58) Field of Search .......... 700/275–277; 165/2.8; 237/8 R; 236/11, 46 R

(56) References Cited

U.S. PATENT DOCUMENTS

| | | | |
|---|---|---|---|
| 3,610,523 A | 10/1971 | Troy | |
| 4,065,676 A | 12/1977 | Elias | |
| 4,071,745 A | 1/1978 | Hall | |
| 4,111,357 A | 9/1978 | Mieczkowski | |
| 4,127,107 A | 11/1978 | Melgeorge | |
| 4,205,381 A | 5/1980 | Games et al. | |
| 4,300,199 A | 11/1981 | Yoknis et al. | |
| 4,347,712 A | 9/1982 | Benton et al. | |
| 4,349,148 A | 9/1982 | Liberto et al. | |
| 4,356,962 A | 11/1982 | Levine | |
| 4,364,111 A | 12/1982 | Jocz | |
| 4,381,075 A | 4/1983 | Cargill et al. | |
| 4,474,325 A | 10/1984 | Richardson | |
| 4,646,964 A | * 3/1987 | Parker et al. | 236/49.3 |
| 4,673,826 A | 6/1987 | Masson | |
| 4,695,246 A | 9/1987 | Beilfuss et al. | |
| 4,725,001 A | 2/1988 | Carney et al. | |
| 4,782,889 A | 11/1988 | Bourne | |
| 4,844,335 A | * 7/1989 | McKinley et al. | 237/8 R |
| 4,845,416 A | 7/1989 | Scholl et al. | |
| 4,931,948 A | 6/1990 | Parker et al. | |
| 4,946,096 A | * 8/1990 | Ballard et al. | 236/11 |
| 4,978,063 A | 12/1990 | Chase | |

(List continued on next page.)

Primary Examiner—Leo Picard
Assistant Examiner—Douglas S. Lee
(74) Attorney, Agent, or Firm—Evelyn H. McConathy; Lisa Burgin Conte; Dilworth Paxson, LLP

(57) ABSTRACT

The invention provides a low electric power-consuming heating or cooling system comprising a DC powered microprocessor-based control system and method and a DC powered electrically actuated zone valve. The control system operates on DC power allowing the heating or cooling system to operate independently of electrical utility grid power, without compromising heating system safety. Electric power consumption is minimized by using very energy efficient DC powered devices and circuit components, and a very energy efficient DC powered zone valve. The control system detects and displays errors in the system and transmits audio-visual alarms when errors are detected, and is also capable of communicating with external computers for data storage and error diagnosis. The zone valve actuator uses DC power and DC electrical and electronic components. The position of the valve is indicated by a sensing system, and valve position is known a priori without rotating the valve. A microprocessor connected to the sensing system controls power delivery to the zone valve actuator based on the output of the sensor system.

26 Claims, 14 Drawing Sheets

U.S. PATENT DOCUMENTS

| | | |
|---|---|---|
| 5,024,265 A | 6/1991 | Buchholz et al. |
| 5,051,936 A | 9/1991 | Gleason, III et al. |
| 5,085,401 A | 2/1992 | Botting et al. |
| 5,119,988 A | 6/1992 | Fiedrich |
| 5,131,623 A | 7/1992 | Giordani et al. |
| 5,161,606 A | 11/1992 | Berkeley et al. |
| 5,203,497 A * | 4/1993 | Ratz et al. ............... 236/46 R |
| 5,226,454 A | 7/1993 | Cabalfin |
| 5,245,835 A | 9/1993 | Cohen et al. |
| 5,318,104 A * | 6/1994 | Shah et al. ............... 165/208 |
| 5,337,952 A | 8/1994 | Thompson |
| 5,340,028 A | 8/1994 | Thompson |
| 5,408,573 A | 4/1995 | Jamieson et al. |
| 5,443,207 A | 8/1995 | Genga |
| 5,515,297 A | 5/1996 | Bunting |
| 5,540,414 A | 7/1996 | Giordani et al. |
| 5,542,603 A | 8/1996 | Macduff |
| 5,556,027 A | 9/1996 | Fiedrich |
| 5,592,989 A | 1/1997 | Lynn et al. |
| 5,622,221 A * | 4/1997 | Genga et al. ............... 165/208 |
| 5,622,310 A | 4/1997 | Meyer |
| 5,692,676 A | 12/1997 | Walker |
| 5,739,504 A | 4/1998 | Lyons et al. |
| 5,779,143 A * | 7/1998 | Michaud et al. ............ 237/8 R |
| 5,844,328 A | 12/1998 | Furst |
| 5,881,681 A | 3/1999 | Stuart |
| 6,062,485 A | 5/2000 | Stege et al. |
| 6,109,531 A | 8/2000 | Hollis |
| 6,186,471 B1 * | 2/2001 | Genga et al. .......... 251/129.12 |
| 6,237,855 B1 * | 5/2001 | Stickney et al. ............ 237/8 R |

* cited by examiner

LOW-POWER HOME HEATING OR COOLING SYSTEM

REFERENCE TO RELATED APPLICATIONS

This application claims priority to U.S. Provisional Application No. 60/299,647, filed Jun. 20, 2001.

FIELD OF THE INVENTION

The present invention relates generally to a fossil fuel-fired home heating or cooling system that consumes minimal electrical power for operation and control.

BACKGROUND OF THE INVENTION

The AC relay-based control scheme for home heating systems has not changed substantially since the early 1930s. Since 1945, major developments in home heating systems have consisted of adding additional components and safety mechanisms such as stack dampers and flame sensors. However, the control scheme has not been updated.

Heating systems typically have control schemes wherein most of the components in the heating system are activated or deactivated by closing or opening AC relay contacts. These electromagnetic switches close or open when the circuit supplying power to the magnetic coils within them are energized or de-energized. In gas-fired hydronic systems, the boiler control circuit coordinates the operation of the circulator pump, stack damper and gas valve. The zone valves, thermostats and boiler control circuits in these systems typically operate on non-lethal 24V AC power, which is obtained from 110/120V AC household power using a transformer.

In recent years, development in home heating systems has focused on improving the Annual Fuel Use Efficiency of the boiler or furnace, which considers only consumption of fossil fuel and not the electrical energy used by components in the system. Electric power demand of fuel-burning heating systems has consequently increased, such that today, a typical system consumes 20W on standby, as much as 2 kW during main burner ignition and 250–550W during normal hydronic boiler or hot-air furnace operation. Due to its high electricity demand, when utility power goes off, the typical heating system can operate only if an expensive back-up power system has been installed. Moreover, when building heating systems fail during the winter, the effects can be harmful to the health and safety of building occupants and the integrity of the building plumbing systems. To date, there has been no move to redesign the control system to try to reduce the electric power consumption of home heating system controls in order to address these problems with the prior art.

Additionally, there is no easy way to troubleshoot faults in conventional home heating systems. For example, if the blocked vent switch on the stack damper in a gas-fired heating system opens, the gas valve will close, but the stack damper will stay open and the circulator pump will stay on. Diagnosis of this problem is complicated because no error messages or indications are displayed anywhere in the system. Thus, conventional heating systems suffer from poor error detection capabilities.

U.S. Pat. No. 6,237,855 (Stickney et al.) describes a system for controlling a hydronic heating system with a DC power source. This system uses DC power as the primary source of electricity by having DC relays and separate DC pumps for each zone. But this system also uses DC-AC inverters and DC-DC converters, which have significant electrical losses associated with them. Thus, even though this system uses DC power, it does not redesign the control system so as to use microprocessors to control the heating system operation, to further reduce power consumption, or to provide enhanced system diagnostics.

Various microprocessor-based control systems have been developed for heating systems. Microprocessor-based systems described in U.S. Pat. Nos. 4,381,075 (Cargill et al.), and 4,844,335 (McKinley et al.) compare the temperature of the water in the boiler and the temperature of outside air to control the boiler water temperature. These systems concentrate on controlling the temperature of the boiler water but not the other control circuits in the system.

The microprocessor-based system described in U.S. Pat. No. 5,318,104 (Shah et al.) further utilizes a microprocessor-based controller for comparing the set temperature and the actual temperature for controlling the cycling of the heating/cooling plant. The microprocessor activates the heating/cooling plant based on which zone in the system requires the most heat/cooling (the zone of greatest thermal error).

The electronic boiler control unit described in U.S. Pat. No. 5,779,143 (Michaud et al.) combines several controls in one circuit, thus requiring no external wiring. The microprocessor for this hydronic heating system changes boiler water temperature in relation to the outside air temperature as well as the current boiler water temperature and operates zone valves based on a priority heating zone. Again, this system improves the seasonal efficiency of the boiler, but does not alter the control circuits for the other components in the system.

Finally, U.S. Pat. No. 5,515,297 (Bunting) describes a monitoring and diagnostic apparatus for an oil-only burner system, with three sensors that are able to detect and display errors in the operation of the burner thermostat, burner ignition transformer, and stack vent outside temperature. A microprocessor records and displays the data the three sensors measure for diagnosis of the operational history over a pre-selected time interval.

However, to date, no commercially available microprocessor-based control system for a home heating system has been designed to operate independently from the electric utility grid (AC power) by using DC power. In addition, no heating system incorporates the detection and display of errors in the heating system when they occur. Furthermore, no control system for a home heating system is capable of communicating with an external computer for purposes of data storage or error diagnosis.

Zone valves are used in hydronic heating and cooling systems to deliver hot or cold water to a particular area, or zone, of the entire area served by a heating or cooling system. Typically, the zone valve receives a contact closure signal from a thermostat, which causes the valve to open. Conventionally, a heat motor or an electric motor is turned on, and stays on to hold the valve open. The valve typically opens by driving an elastomeric diaphragm or ball away from a seat against a spring, or by holding a rotary valve, like a ball valve, open against a spring. When the thermostat contacts open, the motor circuit opens and the valve is returned to the closed position by a mechanical restorative device, typically a spring-return mechanism. Power must therefore be supplied to the valve whenever it has to be opened, making zone valves highly electrical energy inefficient. A typical valve is powered by a 24 volt AC power supply.

U.S. Pat. Nos. 5,131,623 and 5,540,414 (Giordani et al.) describe a zone valve where a motor driven actuator rotates a ball valve 90 degrees from closed to open position. When the motor is de-energized, the valve is returned to its normally closed position by a spring.

U.S. Pat. No. 6,186,471 (Genga et al.) describes a zone valve with a motor driven actuator that rotates a valve from a first position to a second position, such that the motor is only rotated when the valve changes position. At least one of the positions is a fail-safe position to which the valve will return if there is a loss of electrical power. As the valve turns, a sensor, as opposed to a mechanical switch, detects when the valve has reached a desired position and the motor is de-energized. However, the position of the valve is not known a priori without using the actuator to rotate the valve. The actuator provides a capacitive energy storage element that powers the motor in case of power failure.

Consequently, a need exists for a valve wherein (i) a motor turns the valve, and (ii) power to the motor is controlled using a sensing system that detects the position of the valve, and (iii) the position of the valve can be determined without rotating the valve. Such a scheme would be beneficial in enabling the development of remote indicators that detect and display the state of each zone valve in a heating system. In addition, if the state of each zone valve is known when power returns, then there is no need for any zone valve in a home heating system to move to a fail safe position upon power loss.

Additionally, no zone valve for a heating or cooling system using a rotary valve has been actuated using a DC power supply, a DC motor, and DC control components designed so as to use significantly less power than AC components to do the same tasks.

The low powered valve actuator described in U.S. Pat. No. 5,085,401 (Botting et al.) provides a complex mechanical device which creates a high mechanical (torque) ratio for turning a valve. The device increases the effective torque generated by a DC motor which is usually limited by its DC power source. This device provides high torque from a relatively low voltage source, necessarily at the expense of low rotational speed.

Another actuator producing high torque output for less electrical power is the electrically actuated flow diversion valve described in U.S. Pat. No. 5,226,454 (Cabalfin). In order to reduce electrical power consumption for a given torque output, the diverter valve includes a DC motor and gear reducer assembly. The actuator includes a built-in rectifier to convert AC input power to DC power to actuate the DC motor.

The prior art thus describes devices using low voltage DC power to operate a valve. However, these valves still require high torque for operation. Therefore, despite the fact that zone valves control flow but need not seal against high pressure, no prior art describes a DC operated rotary valve that does not require high torque to operate. Additionally, no prior art exists for a valve that indicates or reports its "open", "closed" or "neither open nor closed" positions independently of rotating the valve.

Thus, a need remained in the art, which is met by the present invention, for a device that increases the electrical efficiency and reliability of home heating or cooling systems by providing (i) a control system for a heating or cooling system that can operate independently of electrical utility power, (ii) a control system that provides better system diagnostics through increased error detection and display, (iii) a control system that can communicate with computers for data storage or error diagnosis, and (iv) a zone valve that uses DC control components and minimal DC power, and which detects the position of the valve without rotating the valve.

SUMMARY OF THE INVENTION

The present invention provides a device and a method for using minimal electrical power to control a heating or cooling system, thereby achieving off-grid operating capability. The present invention comprises a low-power DC microprocessor-based control system for a heating system that can operate with most conventional heating system components and provide better system diagnostics through increased error detection and display. The present invention further comprises a zone valve that is electromechanically actuated by a DC motor. The present invention does not compromise safety features inherent in conventional heating systems. In fact, with the improved error detection in the present invention, safety of the heating system has been increased. In this manner, the control system for a heating system has become more intelligent.

The present invention provides a microprocessor-based control system device for a heating or cooling system, wherein the control system device further comprises at least one of each of: a thermostat microprocessor, a zone valve microprocessor, and a boiler microprocessor that communicate with one another. Another embodiment of the present invention provides a microprocessor-based control system device for a heating or cooling system, wherein the control system device further comprises: thermostat microprocessor, zone damper microprocessor, and furnace microprocessor that communicate with one another.

A preferred embodiment of the invention provides a control system that detects and displays errors in operation of the system. The invention includes a control system that saves information on power consumption and temperatures in each zone such that improved heating control algorithms can be implemented in the system. Additionally, the control system may display the level of power it is consuming.

In the preferred embodiments of the invention, the control system microprocessors can communicate information to each other and also to the outside world via an interface with a computer.

Another object of the present invention provides an electrically operated actuator for a zone valve in a heating or cooling system, wherein the zone valve further comprises: a DC motor coupled to the valve such that rotation of the motor shaft corresponds to a change in the position of the valve; sensor system which is able to detect the state of the valve, whether it is open, closed, or neither open nor closed; and microprocessor which controls power delivery to the motor based on output of the sensor system.

A preferred embodiment of the invention further comprises: the motor coupled to the zone valve stem by means of gears, wherein the rotation of the motor shaft rotates the valve stem element by 90 degrees in order to change state from open to closed or closed to open. In a preferred embodiment, the valve is a ball valve. In addition, in a preferred embodiment, the actuator includes a means for disengaging the gears to enable manual operation of the valve without affecting normal sensing or reporting of valve position.

The preferred embodiment of the sensor system of the present invention further comprises; two or more sensors, each sensor having two outputs, which detect the position of one or more indicators coupled to the valve stem, such that at least one output state of the sensors corresponds exactly to the open state, at least one output state of the sensors corresponds exactly to the closed state, and at least one output state of the sensors corresponds to neither the open or closed state. In the preferred embodiment of the present invention, the sensors are optical sensors placed 90 degrees apart, whereby the sensors detect one or more cavities or other irregularities on the surface of the gear coupled to the valve stem.

A microprocessor activates the motor when the desired state of the valve is not indicated by the sensors and deactivates the motor when the desired state is indicated. In the preferred embodiment, the microprocessor communicates the state of the valve to other control components of the heating or cooling system and optionally to a computer and/or an external display. As provided in the preferred embodiment, the microprocessor detects if the actuator is unable to rotate the valve to the desired state and indicates such a failure with a buzzer or other built-in indicator, or by communication to other components of the heating or cooling system, a computer, or an external display.

In another preferred embodiment, a method is provided for controlling a heating system comprising: quantifying the room and user-defined set temperatures in a zone through a thermostat microprocessor; communicating the temperatures to a separate zone valve microprocessor; sending the room and user-defined temperatures to a boiler circuit microprocessor; controlling the zone valve position based on the room and user-defined set temperatures; sending information regarding the position of the zone valve to the boiler circuit microprocessor; saving the temperature data; operating a stack vent damper, circulator pump, and gas valve; detecting errors in the boiler components; detecting errors in any zone valves; displaying errors on one or more boiler audio-visual displays, and transmitting the data to a computer. In the preferred embodiment, the system is operated using a low-voltage DC power supply or transformed and rectified AC voltage supply. The preferred embodiment further provides for the display of detected errors on an audio-visual display.

In yet another preferred embodiment, a method is provided for controlling a heating system comprising: quantifying the room and user-defined set temperatures in a zone through a thermostat microprocessor; communicating the temperatures to a separate zone damper microprocessor; sending the room and user-defined temperatures to a furnace circuit microprocessor; controlling the zone damper position based on the room and user-defined set temperatures; sending information regarding the position of the zone damper to the furnace circuit microprocessor; saving the temperature data; operating a stack vent damper, blower, and gas valve; detecting errors in the furnace components; detecting errors in any zone dampers; displaying errors on one or more furnace audio-visual displays, and transmitting the data to a computer. In the preferred embodiment, the system is operated using a low-voltage DC power supply or transformed and rectified AC voltage supply. The preferred embodiment further provides displaying the detected errors on an audio-visual display.

Additional objects, advantages and novel features of the invention will be set forth in part in the description and figures which follow, and in part will become apparent to those skilled in the art on examination of the following, or may be learned by practice of the invention.

DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown.

DESCRIPTION OF PREFERRED EMBODIMENTS OF THE INVENTION

Figure 1:
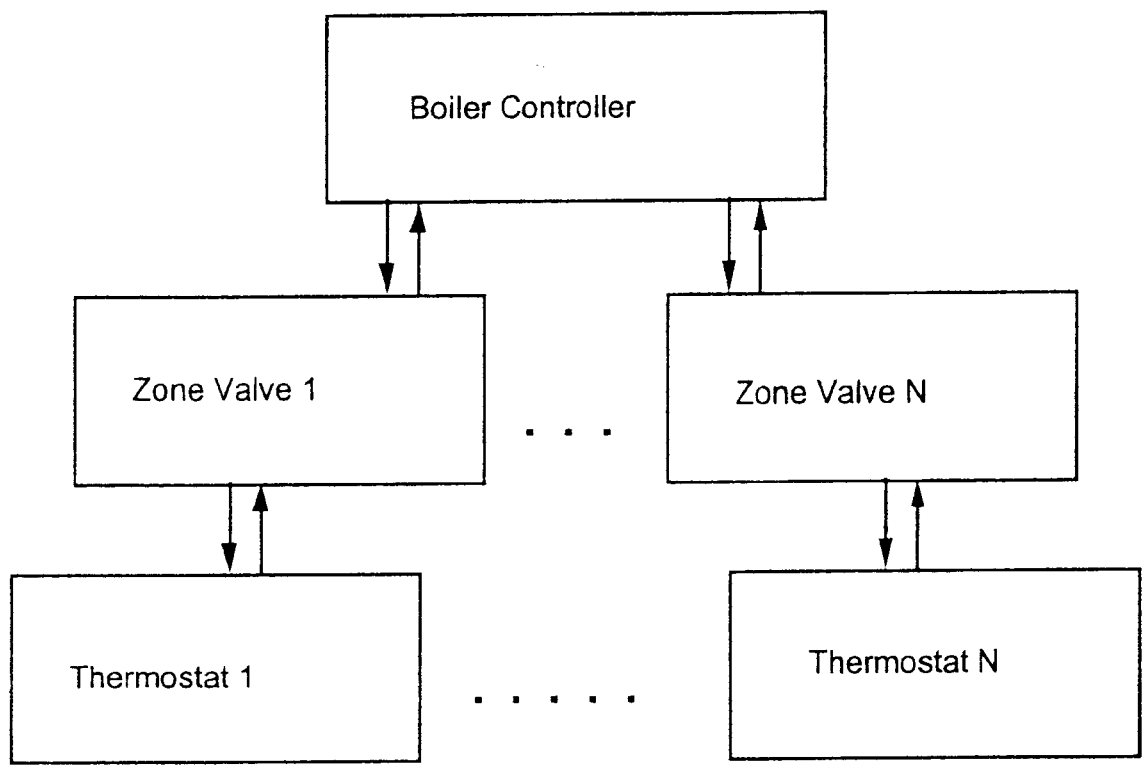
FIG. 1 is a block diagram of the microprocessor-based control system for a heating system showing a plurality of zones and zone thermostats.

The description contained herein relates to a low-powered heating or cooling system comprising a DC powered microprocessor-based control system and a DC powered zone valve. This description, however, is intended to be illustrative only and not limiting as to the scope of the present invention. Referring now to the drawings, the details of an embodiment of the invention are graphically and schematically illustrated. Like elements in the drawings may be represented by like numbers.

A "conventional home heating system" is defined herein to include fossil fuel-burning home hydronic, steam and forced-air heating systems which comprise a boiler or furnace, a circulator means, and one or more zones. "Fossil fuels" are defined herein as fluid fuels, specifically any oil or gas fuel, or derivative thereof, used in heating systems, including, but not limited to, oil, natural gas, propane, and butane.

In a preferred embodiment, the conventional home heating system is a multizone gas-fired hydronic home heating system, wherein each zone has an associated zone valve, thermostat, and convector or other heat exchange means, and wherein the system includes electrical control circuits for the zone valves and boiler. The water circulating means for a hydronic system comprises a circulator pump. The boiler in a gas-fired hydronic home heating system has a gas valve that permits flow of gas to the boiler burners, a stack vent damper that allows combustion products to leave the home, and several safety features. The safety features include a blocked stack vent damper switch, a boiler water over-temperature switch, and a boiler flame roll-out switch.

The present invention comprises a control system that can operate on low-voltage DC power or DC power provided, equivalently, by transformed and rectified AC voltage power supply. The power consumption is minimized using low-power consuming electronic components so that the system can be powered by, for example, batteries. Thus, the low-power consuming control system allows for the operation of the heating system even when there is a failure in the main utility electrical or grid power. Most of the heat generation and delivery components (stack dampers, gas valves, circulator pumps) in a conventional home heating system work with the control system of the present invention. The control scheme of the present invention can also be easily adapted to other types of heating and cooling systems.

In a preferred embodiment, the DC power for the system is supplied by batteries. In the exemplary embodiment, two 12V batteries in series are used. However, one skilled in the art would know that various numbers and sizes of batteries may be used to meet the power requirements of the system. Similarly, one skilled in the art would know of various ways to charge the batteries, for example, trickle-charging from the electric utility grid, charging by solar photovoltaic panels, or using a standby generator.

FIG. 1 is a block diagram of a control system for a hydronic heating system showing a plurality of zone valve control circuits, thermostat control circuits, and a single boiler controller (the boiler control circuit). Such a control system is typical in most hydronic home heating system control circuits. However, the prior art systems use, at most, one microprocessor. In the present invention, each control circuit component incorporates a microprocessor that communicates with the others (denoted by arrows in the figure). The "control system intelligence", that is, the computing or decision-making functions of the control system, is distributed among the thermostat, zone valve, and boiler circuit microprocessors, so that the intelligence can be re-distributed by a change in microprocessor software and not system hardware. In a preferred embodiment of the present invention the microprocessors used are the PIC™16C73A microprocessor manufactured by Microchip Inc. One skilled in the art would be aware of various microprocessors, for example, the Motorola 6811 microcontroller, which have the same functionality.

The present invention provides a microprocessor-based control system, wherein each heating zone in the system contains a thermostat that incorporates a microprocessor. "Thermostat" is used herein to mean a mechanical or electrical device that senses temperature. However, it is also possible to use conventional thermostats in the preferred embodiment. The thermostat microprocessor: (i) reads room and user-defined set temperatures in its zone through the thermostat, and (ii) communicates these temperatures to a separate zone valve microprocessor that resides in its zone valve control circuit.

Each zone valve microprocessor: (i) obtains room and user-defined set temperatures from its zone's thermostat microprocessor and sends these temperatures to a boiler circuit microprocessor, (ii) controls the opening and closing of its zone valve based on the room and user-defined set temperatures, and (iii) sends the state of its zone valve (OPEN, CLOSED, or NEITHER open nor closed) to the boiler circuit microprocessor. By "state" with reference to the zone valve is meant the current position of the valve itself, that is whether the valve is OPEN (permitting heated or cooled fluid to pass through the system), CLOSED (blocking passage of heated or cooled fluid), or NEITHER (permitting a restricted amount of heated or cooled fluid to pass through). DC electrically actuated zone valves that incorporate microprocessors operating with the control system are further described below.

The boiler circuit microprocessor: (i) obtains room and user-defined set temperatures from the zone valve microprocessors, (ii) saves temperature data, displays it on a boiler audio-visual display, and transmits it to a computer for further display and network transmission, (iii) operates the stack vent damper, circulator pump and gas valve on the system when one or more of the zone valves are open, and (iv) detects errors in boiler components and zone valves and displays these errors on one or more boiler audio-visual displays.

Figure 2:
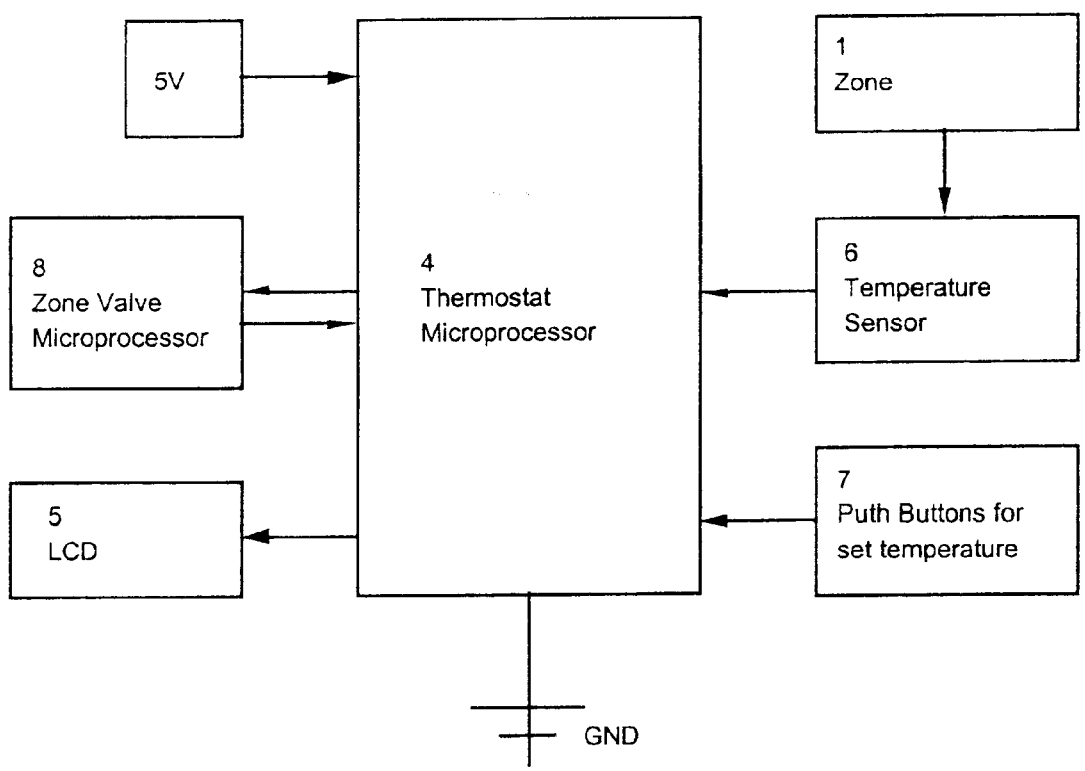
FIG. 2 is a block diagram of the thermostat control circuit.

FIG. 2 is a block diagram of a thermostat control circuit showing thermostat microprocessor 4 that is interfaced to LCD 5, temperature sensor 6, and two push-buttons 7. The LCD displays room and set temperatures in the zone 1. The two-push buttons 7 are used to set the set temperature in the zone by increasing or decreasing it in one degree Fahrenheit increments.

Figure 3:
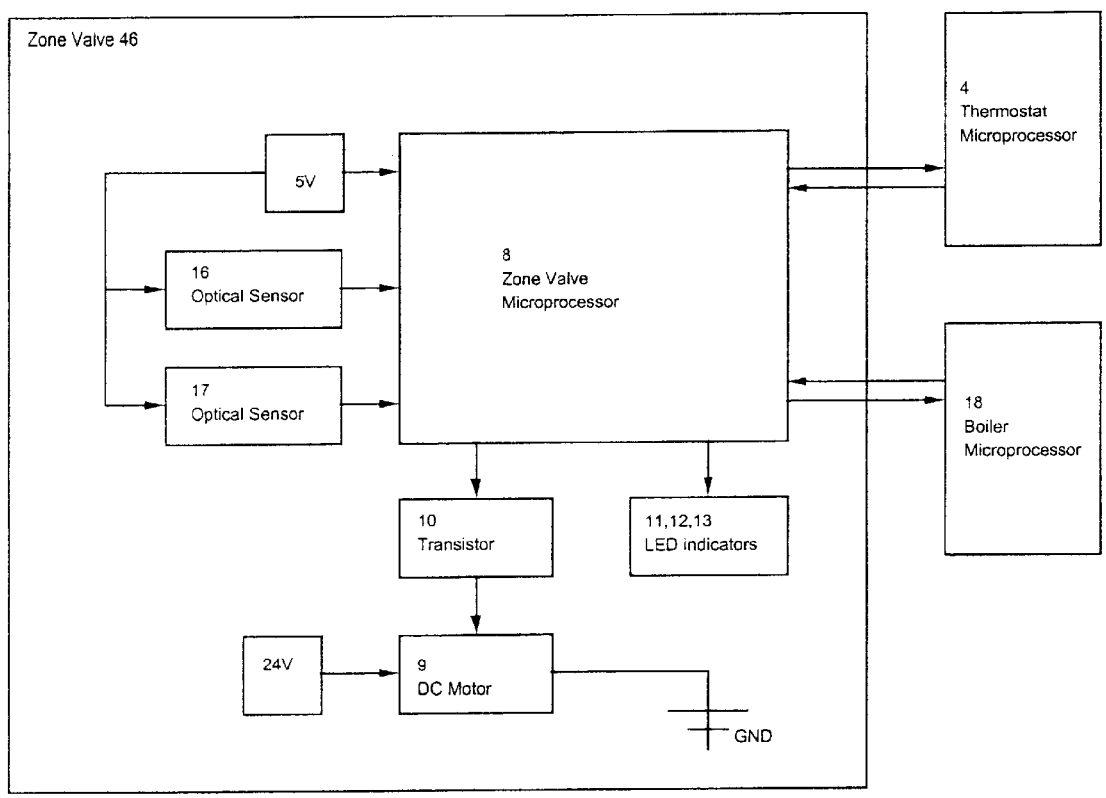
FIG. 3 is a block diagram of the zone valve control circuit.

FIG. 3 is a block diagram of a zone valve control circuit showing zone valve microprocessor 8 that is connected to DC motor 9 via transistor 10, connected to zone valve LED indicators 11, 12, and 13, and two optical sensors 16 and 17. In addition, zone valve microprocessor 8 is connected to boiler microprocessor 18 and thermostat microprocessor 4. DC motor 9 actuates the stem of zone valve 46.

Figure 4:
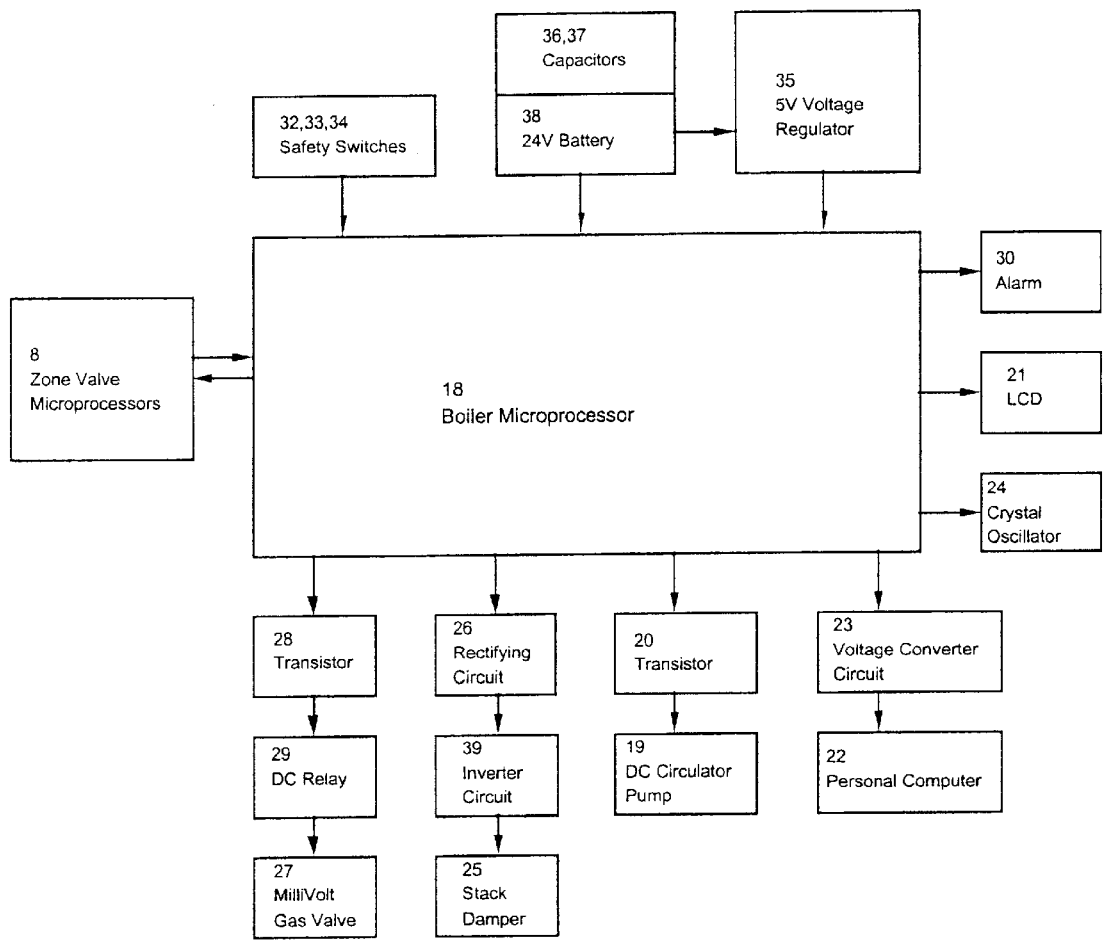
FIG. 4 is a block diagram of the boiler control circuit.

FIG. 4 is a block diagram of the boiler control circuit showing boiler microprocessor 18, connected to DC circulator pump 19 via transistor 20, LCD 21, personal computer 22 via DC voltage converter circuit 23, crystal oscillator 24, stack damper 25 via inverter circuit 39 and rectifying circuit 26, milliVolt gas valve 27 via transistor 28 and DC relay 29, audio alarm device 30, one or more zone valve microprocessors 8, boiler over-temperature switch 32, boiler flame roll-out switch 33, blocked vent switch 34, and 5V DC voltage regulator 35. Capacitors 36 and 37 are used to prevent sudden variations in the power supply voltage 38. The stack damper 25, circulator pump 19 and milliVolt gas valve 27 are readily available commercial components that can be applied to the control circuit of the present invention. In an alternative embodiment, a conventional 24V AC gas valve is used instead of the milliVolt gas valve in the boiler control circuit.

FIGS. 5, 6, 7, and 8 are flow charts which show the control algorithms implemented in the thermostat, zone valve and boiler control circuits respectively. The sequence of operations in the control algorithms corresponds to that of a conventional heating system.

Figure 5:
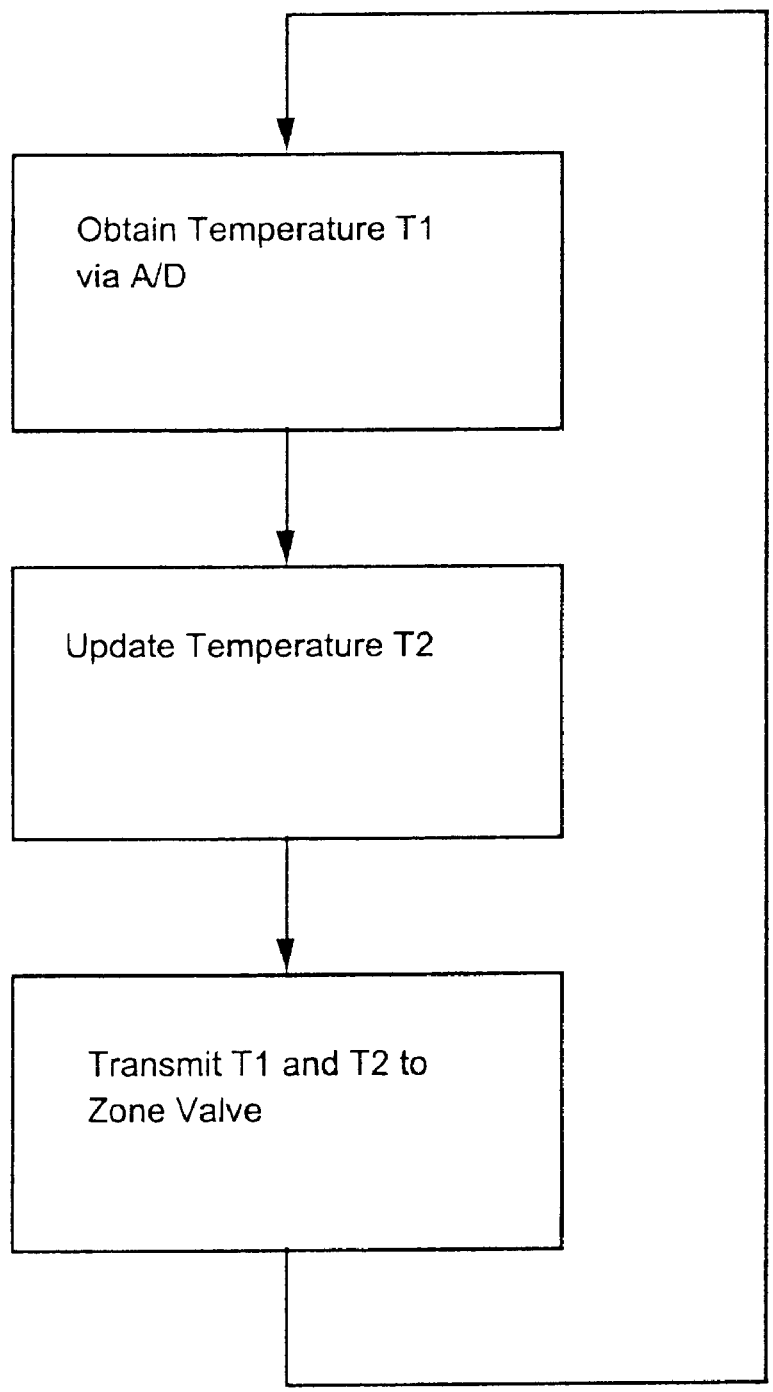
FIG. 5 is a flow chart depicting the control algorithm for the thermostat control circuit.

As shown in FIGS. 2 and 5, each thermostat microprocessor 4 receives and stores room temperatures $T_1$ in one of the zones 1 as sensed by temperature sensor 6. In addition, each thermostat microprocessor 4 receives and stores set temperatures $T_2$ in the zone, which are set by the user via push buttons 7. At regularly spaced intervals (that can be defined in the microprocessor software), each thermostat microprocessor 4 transmits these temperatures to zone valve microprocessor 8. The communication protocol for data transmission from each thermostat microprocessor 4 to each zone valve microprocessor 8 can follow either a serial or parallel communication protocol. In the exemplified embodiment of the present invention, an interrupt-based RS-232 communication protocol is used to transmit temperatures $T_1$ and $T_2$ from each thermostat microprocessor 4 to zone valve microprocessor 8.

Figure 6:
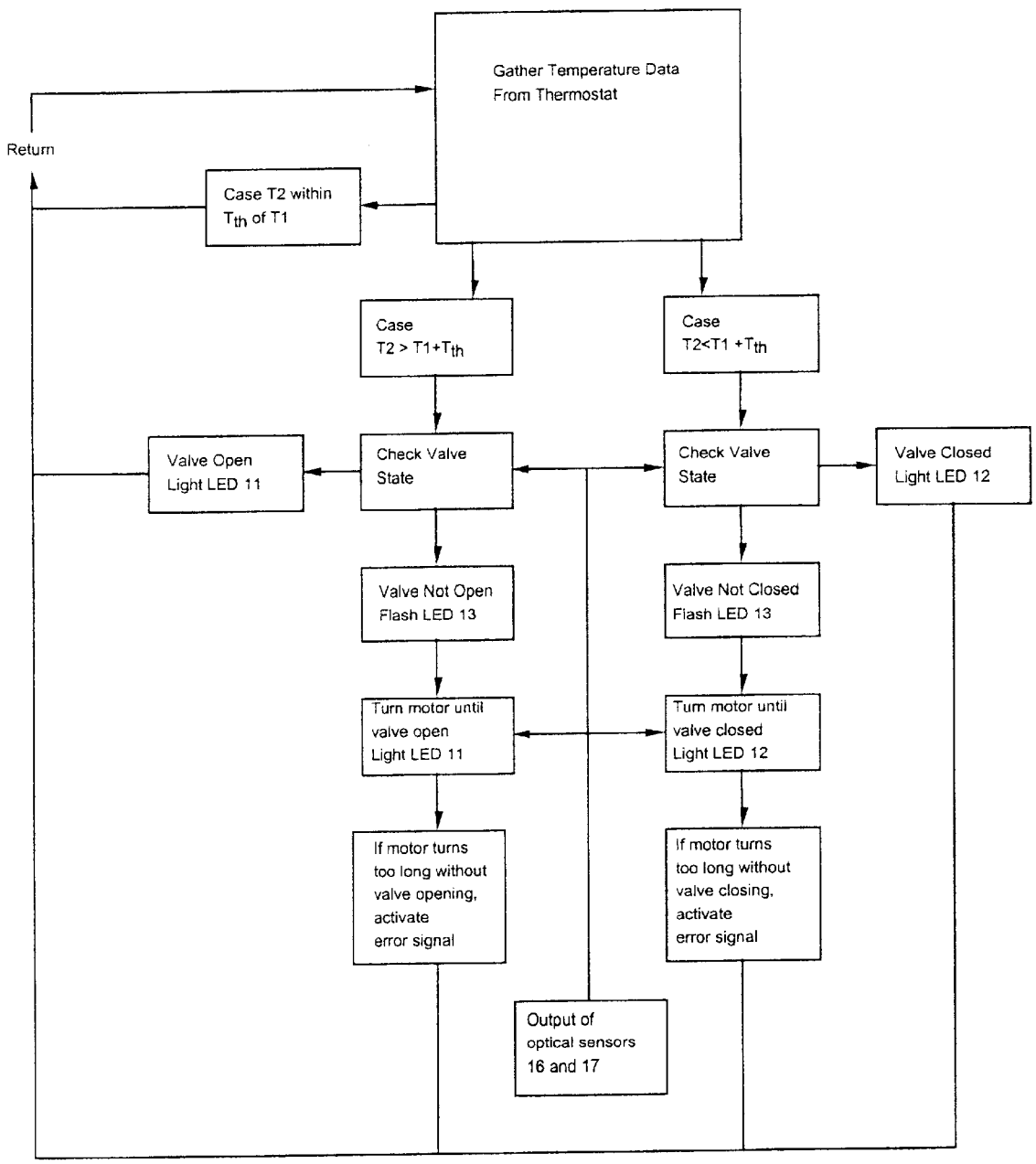
FIG. 6 is a flow chart depicting the control algorithm for the zone valve control circuit.

As shown in FIGS. 3 and 6, at regularly spaced intervals, each thermostat microprocessor 4 sends room and set temperatures, $T_1$ and $T_2$ respectively, from the zone in which it is located to its zone valve microprocessor 8. Whenever temperatures $T_1$ and $T_2$ are received from a thermostat microprocessor 4, a zone valve microprocessor 8 stops its current task, receives temperatures $T_1$ and $T_2$, and then returns to its current task.

Figure 7:
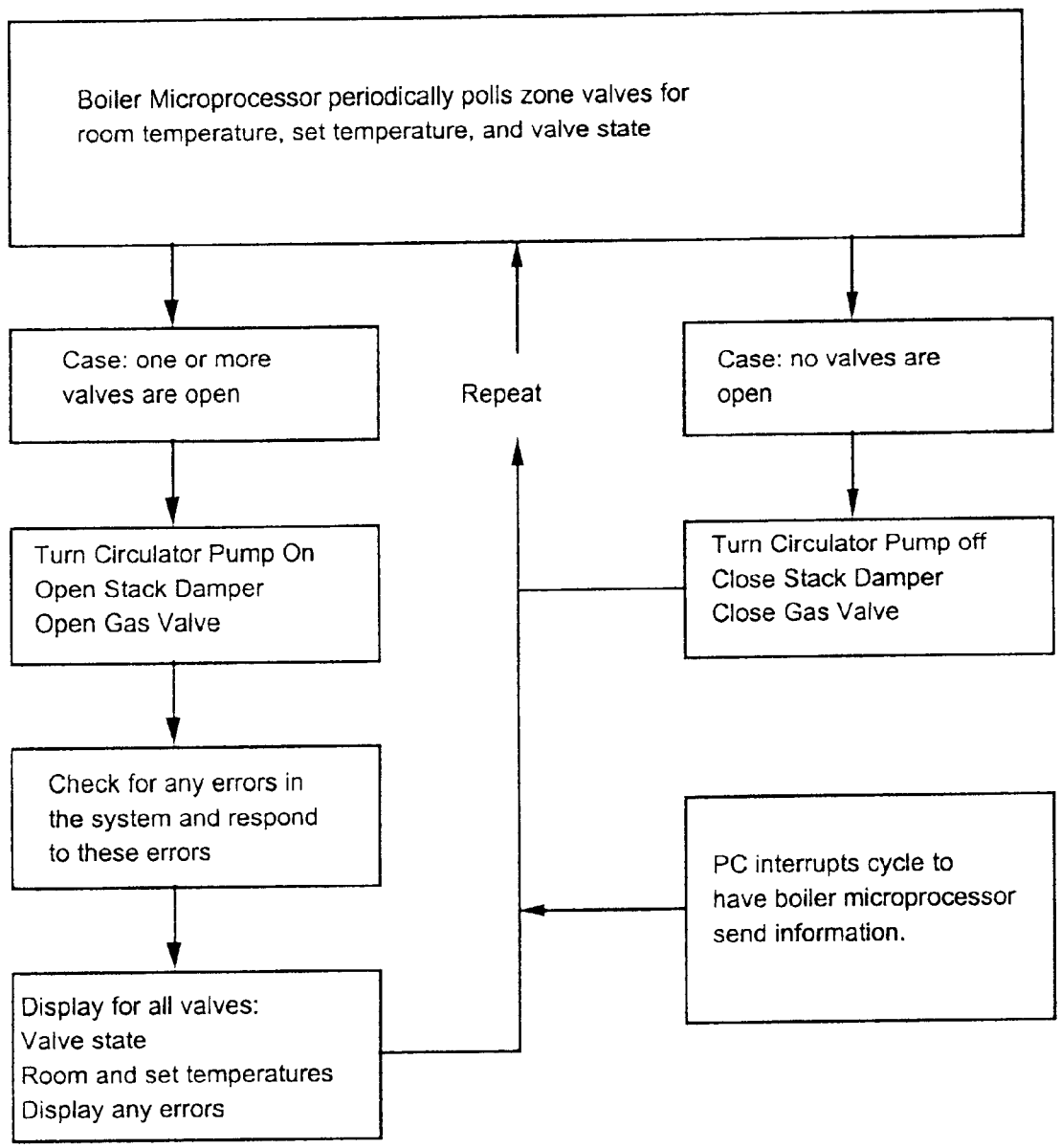
FIG. 7 is a flow chart depicting the control algorithm for the boiler control circuit.

As shown in FIGS. 4 and 7, each zone valve microprocessor 8 communicates with boiler microprocessor 18. In the exemplified embodiment of the present invention these microprocessors use the Motorola SPI™ (Serial Programming Interface) communication protocol. One skilled in the art would know of alternative protocols, for example, the Philips I²C protocol. At regularly spaced intervals, boiler microprocessor 18 sends a message to each zone valve microprocessor 8 via the data-receive line. Each zone valve microprocessor 8 checks for messages on its data-receive line and replies to the boiler control circuit (provided the message it receives from the boiler is a valid message) over the data-transmit line.

Transistor 10 switches from a short circuit state to an open circuit (high impedance) state and vice versa based on input from each zone valve microprocessor 8. When DC motor 9 rotates because current can flow through transistor 10, transistor 10 is ON. When DC motor 9 stops rotating, because current can no longer flow through transistor 10, transistor 10 is OFF. The transistors in a preferred embodiment of the present invention are N-channel Power Metal Oxide Semiconductor Field Effect Transistors (MOSFETs), manufactured by International Rectifier Inc. However, transistors are well known devices in the prior art and one of ordinary skill in the art would know of other devices that could operate in the present invention to provide the disclosed switching function.

As shown in FIGS. 3, and 6, in a particular zone, if set temperature $T_2$ in a zone is greater than room temperature $T_1$ plus some temperature threshold $T_{th}$ defined in the software on each zone valve microprocessor 8, zone valve microprocessor 8 checks the position of its zone valve 46 via inputs from optical sensors 16 and 17. If its zone valve 46 is OPEN, zone valve microprocessor 8 lights LED 11 and does not turn on transistor 10. LEDs 12 and 13 are then turned off. If its zone valve 46 is not OPEN, or NEITHER open nor closed (as indicated by optical sensors 16 and 17), its zone valve microprocessor 8 flashes LED 13 and turns on transistor 10, allowing current to flow through DC motor 9. Immediately after DC motor 9 begins turning, zone valve microprocessor 8 starts a counter. If zone valve 46 does not open in a certain period of time, transistor 10 and LED 13 are turned off, allowing no current to flow through DC motor 9. Simultaneously, an error signal is transmitted to boiler microprocessor 18 using the data-out line 45. During this entire process, each zone valve microprocessor 8 is periodically interrupted to receive and transmit data to boiler microprocessor 18 and to receive and transmit data to its thermostat microprocessor 4.

Conversely, in a particular zone, if set temperature $T_2$ is less than room temperature $T_1$ plus some temperature threshold $T_{th}$ defined in the software on each zone valve microprocessor 8, zone valve microprocessor 8 checks the state of its zone valve 46 via inputs from optical sensors 16 and 17. If its zone valve 46 is CLOSED, zone valve microprocessor 8 lights LED 12 and does not turn on transistor 10. LEDs 11 and 13 are then turned off. If zone valve 46 is OPEN, or NEITHER open nor closed (as indicated by optical sensors 16 and 17), its zone valve microprocessor 8 flashes LED 13 and turns on transistor 10, allowing current to flow through DC motor 9. Immediately after DC motor 9 begins turning, zone valve microprocessor 8 starts a counter. If a zone valve 46 does not close in a certain period of time, transistor 10 and LED 13 are turned off, allowing no current to flow through DC motor 9. Simultaneously, an error signal is transmitted to boiler microprocessor 18 using the data-transmit line. During this entire process, each zone valve microprocessor 8 is periodically interrupted to receive and transmit data to boiler microprocessor 18 and thermostat microprocessors 4.

As shown in FIGS. 4 and 7, boiler microprocessor 18 periodically polls zone valve microprocessors 8 by sending messages over its data-transmit line to the plurality of zone valve microprocessors 8. First, zone valve microprocessors 8 are sent a message asking them to transmit their state, that is, whether their respective zone valves 46 are OPEN, CLOSED, or NEITHER open nor closed, back to boiler microprocessor 18. Second, zone valve microprocessors 8 are sent a message asking them to transmit room temperatures $T_1$ in their respective zones to boiler microprocessor 18. Third, zone valve microprocessors 8 are sent a message asking them to transmit set temperatures $T_2$ in their respective zones back to boiler microprocessor 18. Upon receipt of each message, each zone valve microprocessor 8 interrupts its current task and responds appropriately to boiler microprocessor 18 data-in line 48. Boiler microprocessor 18 then intermittently displays room temperature $T_1$, set temperature $T_2$, and the states of zone valves 46 on LCD 21.

Figure 8:
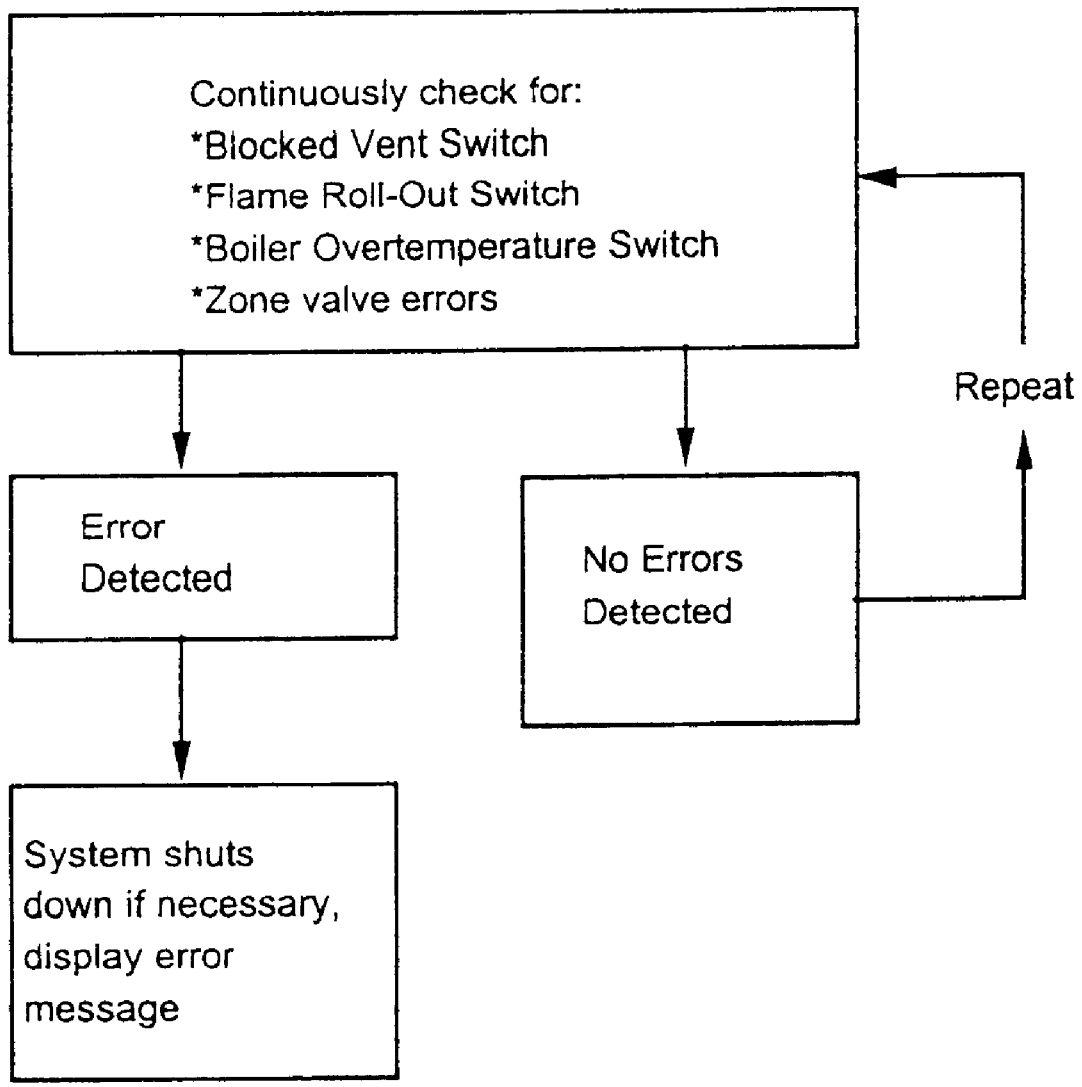
FIG. 8 is a flow chart depicting the error control algorithm for the boiler control circuit.
Figure 9:
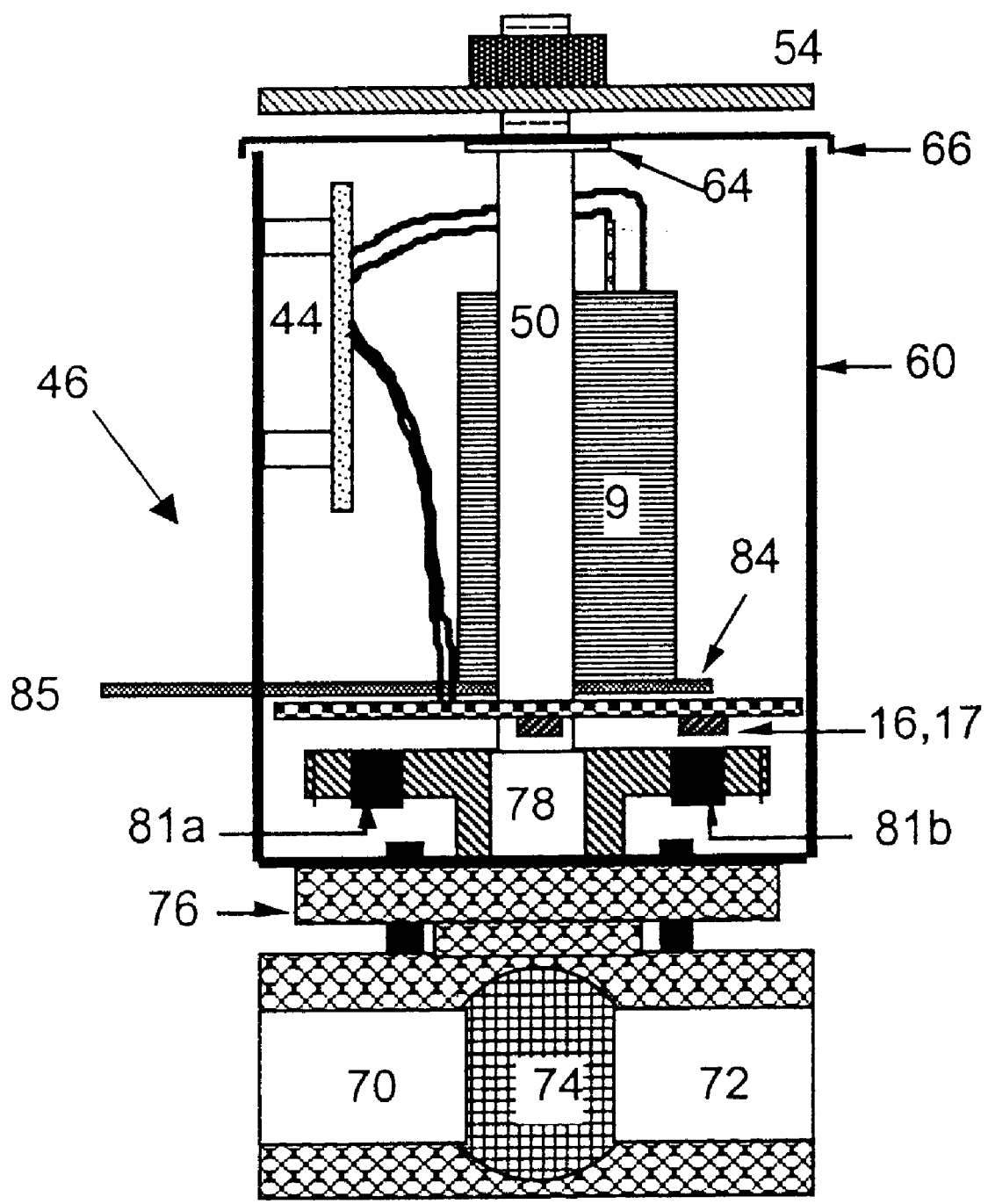
FIG. 9 illustrates a side view of the zone valve with the cover removed.
Figure 10:
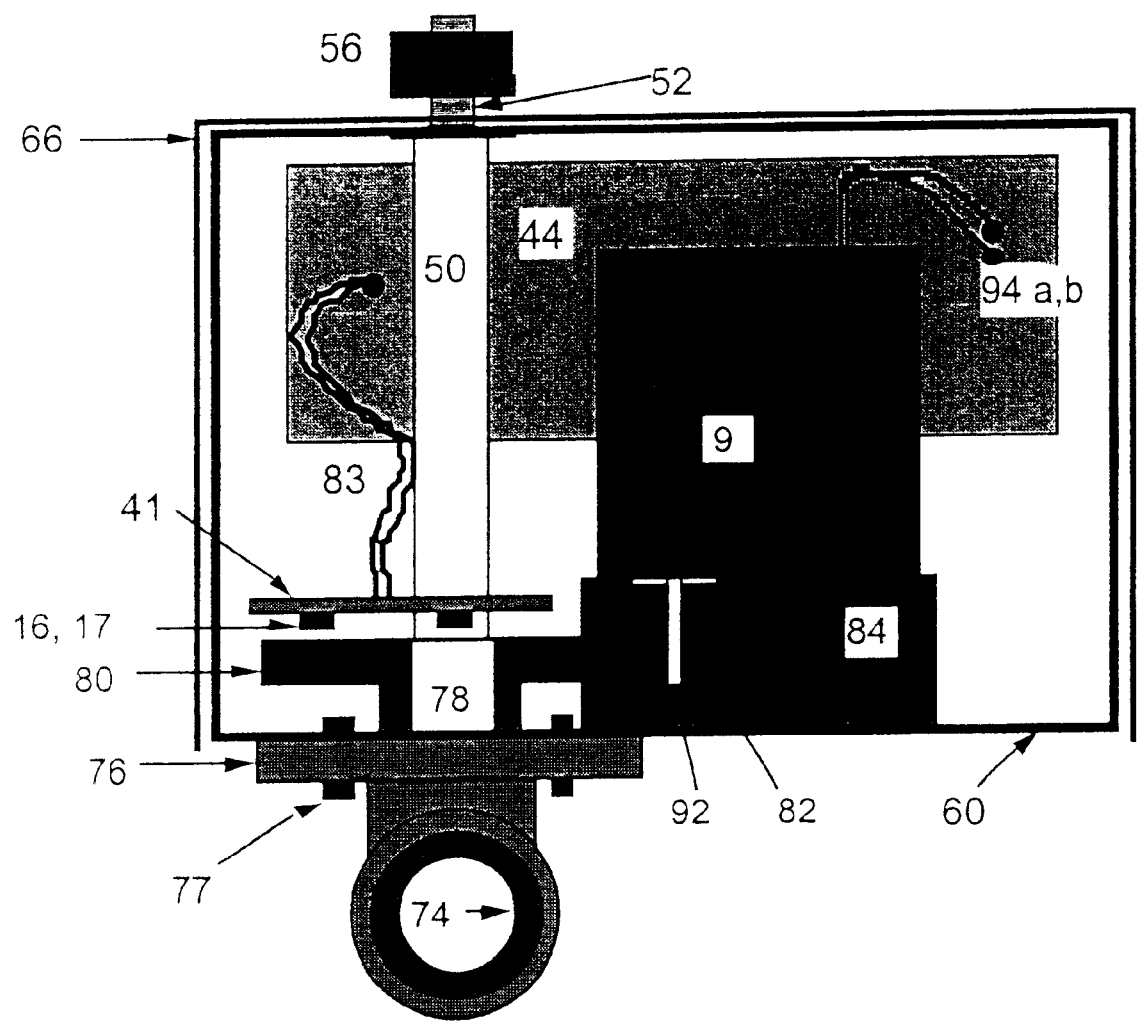
FIG. 10 illustrates a side view of the zone valve, rotated 90 degrees from FIG. 9.
Figure 11:
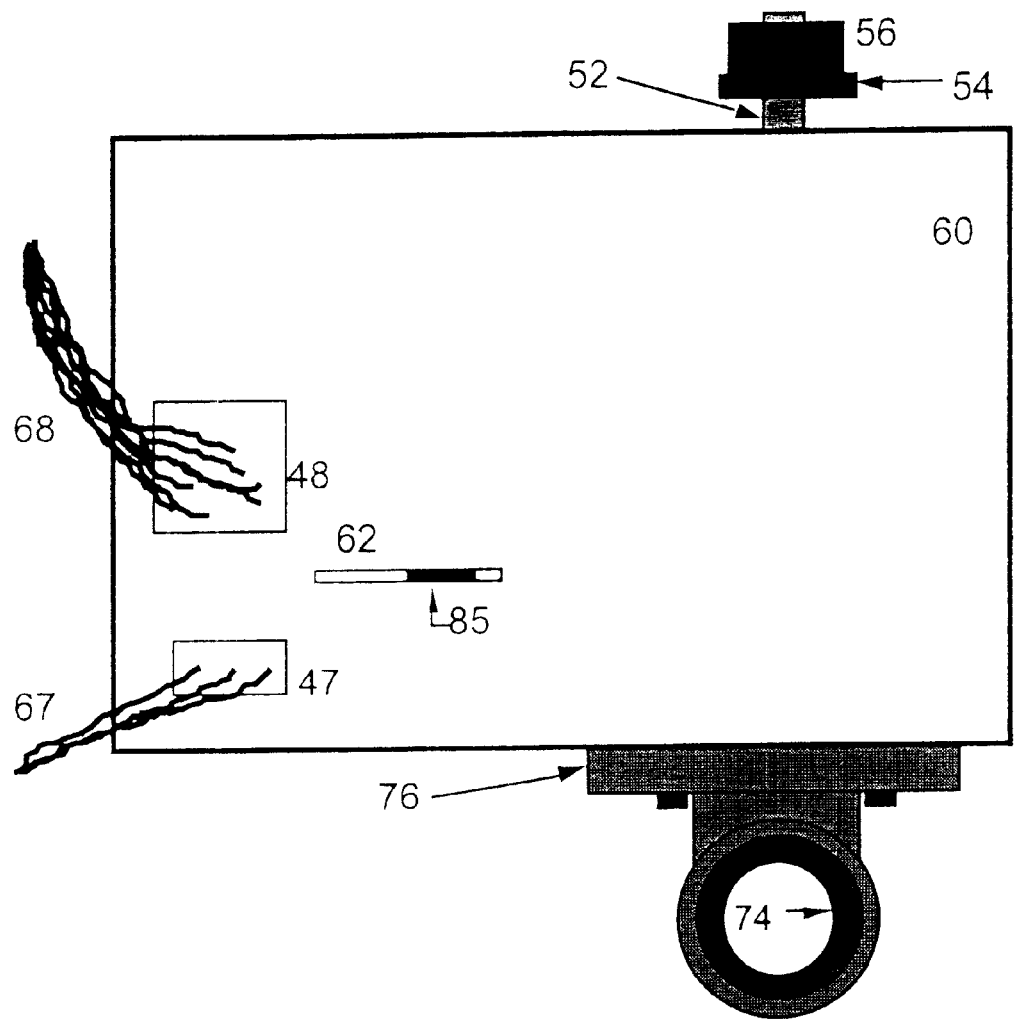
FIG. 11 illustrates a side view of the zone valve, rotated 180 degrees from FIG. 10.
Figure 12:
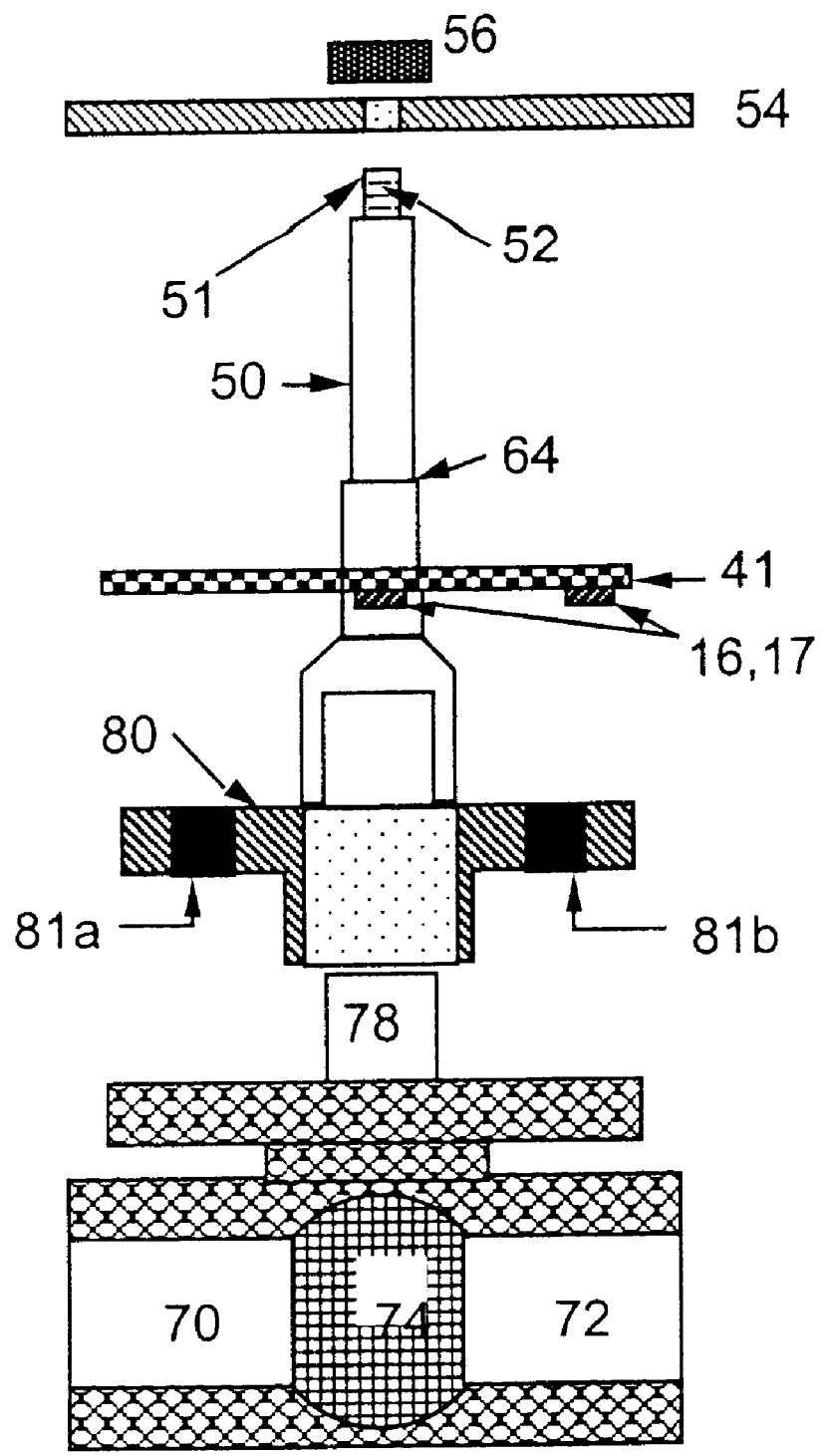
FIG. 12 illustrates an exploded view of the main axis of the zone valve.

As shown in FIGS. 4 and 8, boiler microprocessor 18 also continuously checks inputs from boiler over-temperature switch 32, boiler flame roll-out switch 33 and blocked vent switch 34. If any one of these switches opens, indicating an error in one of the boiler components, boiler microprocessor 18 stops carrying out its current task, transmits an alarm on audio alarm device 30, and displays a message on LCD 21 indicating the error in the boiler. Boiler microprocessor 18 continues to stay in this "alarm state" until all errors in the boiler components have been fixed. The delay between error detection and error display is less than one second. The delay between the error detection and microprocessor alarm state is also less than one second, a fact confirmed by laboratory tests. In this manner, the safety of a conventional heating system has not been compromised in the preferred embodiment. Furthermore, the heating system error diagnosis for a heating system serviceperson has been made easier with the use of audio-visual error display devices.

As shown in FIGS. 4 and 7, when one or more zone valves 46 are OPEN, boiler microprocessor 18 turns on transistor 20, thereby supplying power to DC circulator pump 19. Next, boiler microprocessor 18 forces stack damper 25 to open via inputs to inverter and rectifying circuits 39 and 26, respectively. Then boiler microprocessor 18 opens milliVolt gas valve 27 by turning on transistor 28, thereby opening DC relay 29, which completes the milliVolt gas valve power supply circuit. When none of the zone valves 46 are OPEN, boiler microprocessor 18 turns off transistor 20, thereby stopping the supply of power to DC circulator pump 19. Then boiler microprocessor 18 forces stack damper 25 to close via inputs to inverter and rectifying circuits 39 and 26, respectively. Finally, boiler microprocessor 18 closes milliVolt gas valve 27 by turning off transistor 28, thereby closing DC relay 29 which now fails to complete the milliVolt gas valve power supply circuit.

Boiler microprocessor 18 is connected to computer 22, and thus, when messages are transmitted to the boiler from the computer, boiler microprocessor 18 interrupts its current task and replies to the computer message appropriately. An example of such a message may be an inquiry requesting the room temperature in a certain zone in a home. With the incorporation of computer 22 in the boiler control circuit, home heating system data, for example, temperatures in each zone, boiler water temperature, and power consumption can be stored on computer 22. This data can be transmitted to the outside world (using the Internet, Ethernet, or other network) or to other parts of the home (using an Intranet or other network).

FIGS. 9 through 13 show detailed diagrams of zone valve 46, including the main axis of the valve and the valve actuator. Valve stem 78 rotates with valve ball 74 which has two states, a CLOSED state wherein flow from inlet port 70 is blocked, and an OPEN state wherein flow from inlet port 70 continues through outlet port 72. The valve can also be in-between states, NEITHER open nor closed. Zone valve 46 is attached to chassis piece 60 at mounting plate 76 by screws 77. Stem 78 is coupled to spur gear 80 and shaft 50 by means of the geometry of these pieces. These three components are prevented from separating axially by disk 64, which has a smaller hole than the top of chassis piece 60, preventing shaft 50 from moving upward. The top of shaft 50 has flats 51 and threads 52, so that handle 54 with a rectangular hole fits snugly and is fastened by nut 56. When zone valve 46 is in an OPEN state, handle 54 is parallel to the line of flow through the valve. Chassis cover 66 slides over chassis piece 60 to close the box.

Zone valve 46 operates when the thermostat signal to zone valve 46 changes, so the thermostat sends a signal to zone valve 46 through communication wires 67 to zone valve microprocessor 8 indicating that zone valve 46 needs to reach a specified state. Zone valve microprocessor 8 delivers power to sensing system 40 which contains optical sensors 16 and 17. The sensors send a signal to zone valve microprocessor 8 through wires 83 and zone valve microprocessor 8 determines if zone valve 46 is in the correct state.

If zone valve 46 is in the correct state, nothing further happens. If zone valve 46 is not in the correct state, zone valve microprocessor 8 delivers power to DC motor 9 through wires 94a,b. Motor shaft 92 rotates pinion 82, which rotates spur gear 80, which rotates shaft 50 and valve stem 78, which in turn rotates valve ball 74. The motor power is cut off when the output of the sensing system 40 corresponds to the desired state. Any change in output of the sensing system causes zone valve microprocessor 8 to send the state of zone valve 46 corresponding to the new output to boiler microprocessor 18 via wires 68, and flashes LED 13. At the same time, alarm 30 and LED 21 are activated to audio-visually indicate the valve error. Meanwhile, zone valve microprocessor 8 starts a clock, and if the desired state of the valve is not reached before enough time has elapsed for one full rotation of spur gear 80, zone valve microprocessor 8 shuts off power to DC motor 9 and sends an error signal to boiler microprocessor 18 via wires 68, and activates error alarm 30. Alarm 30 may be any type of indicator, such as a buzzer or a flashing light, as would be known in the art.

Figure 13:
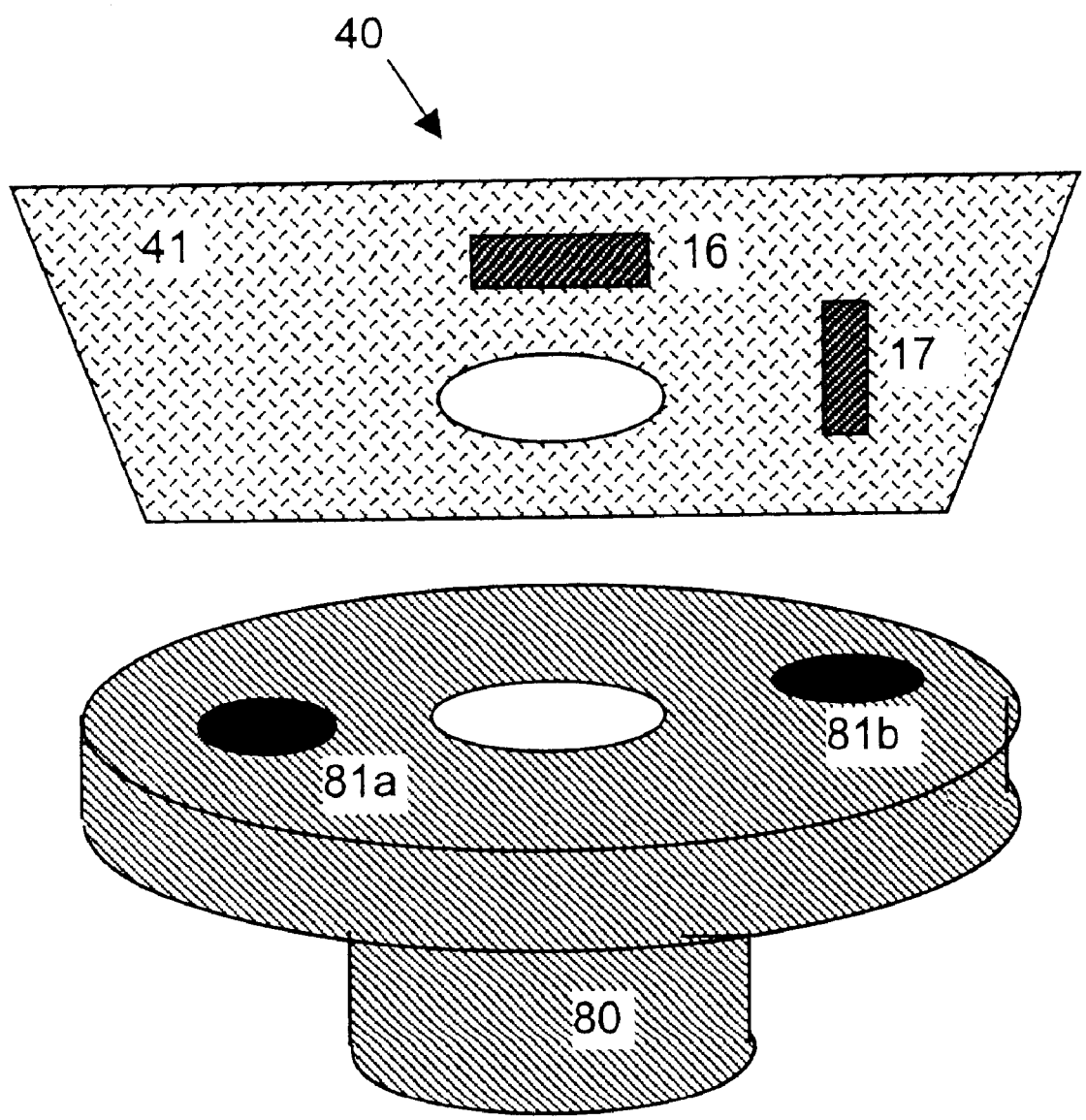
FIG. 13 illustrates a detailed view of the optical sensor layout.

FIG. 13 shows a detailed diagram of sensing system 40. Sensors 16 and 17 are mounted to circuit board 41, 90 degrees apart. In order to provide a reflective surface for the optical sensors, cavities 81a and 81b are positioned in spur gear 80, 180 degrees apart. The distance between the sensors and the cavities, the sensing distance, is set so that the microprocessor can reliably read the sensor output. In a preferred embodiment, cavities are ³⁄₁₆-inch square holes with rounded corners. The sensing distance is in the range of ¹⁄₃₂-inch to ¹⁄₁₆-inch and preferably, as shown in the exemplary embodiment, ³⁄₆₄-inch. However, one skilled in the art would be aware of other irregularities that could be used as cavities 81a and 81b. As shown on FIG. 12, to maintain the proper sensing distance for sensing system 40, circuit board 41, fastened to chassis 60, is held against a shoulder on shaft 50. Various means, such as a plastic foam element, as would be known to one skilled in the art, may be used. When valve ball 74 is positioned such that zone valve 46 is in the CLOSED state, one of the cavities 81a or 81b is directly beneath sensor 17, so that the output of that sensor is "positive" (depending on the type of sensor used, a positive result may correspond to either a digital "low (−)" or a digital "high (+)" voltage), while the output of the sensor 16 is negative. When valve ball 74 is positioned such that zone valve 46 is in the OPEN state, one of the cavities 81a or 81b is directly beneath sensor 16, so that the output of that sensor is positive, while the output of the sensor 17 is negative. When zone valve 46 is in the NEITHER open nor closed state, neither sensor 16 nor 17 lines up with a cavity, so that the output of both sensors is negative. Table 1 below shows the output of sensor system 40 for each state of zone valve 46.

TABLE 1

| Valve State | Output | |
| --- | --- | --- |
| | Sensor 16 | Sensor 17 |
| CLOSED | − | + |
| OPEN | + | − |
| NEITHER | − | − |

Figure 14:
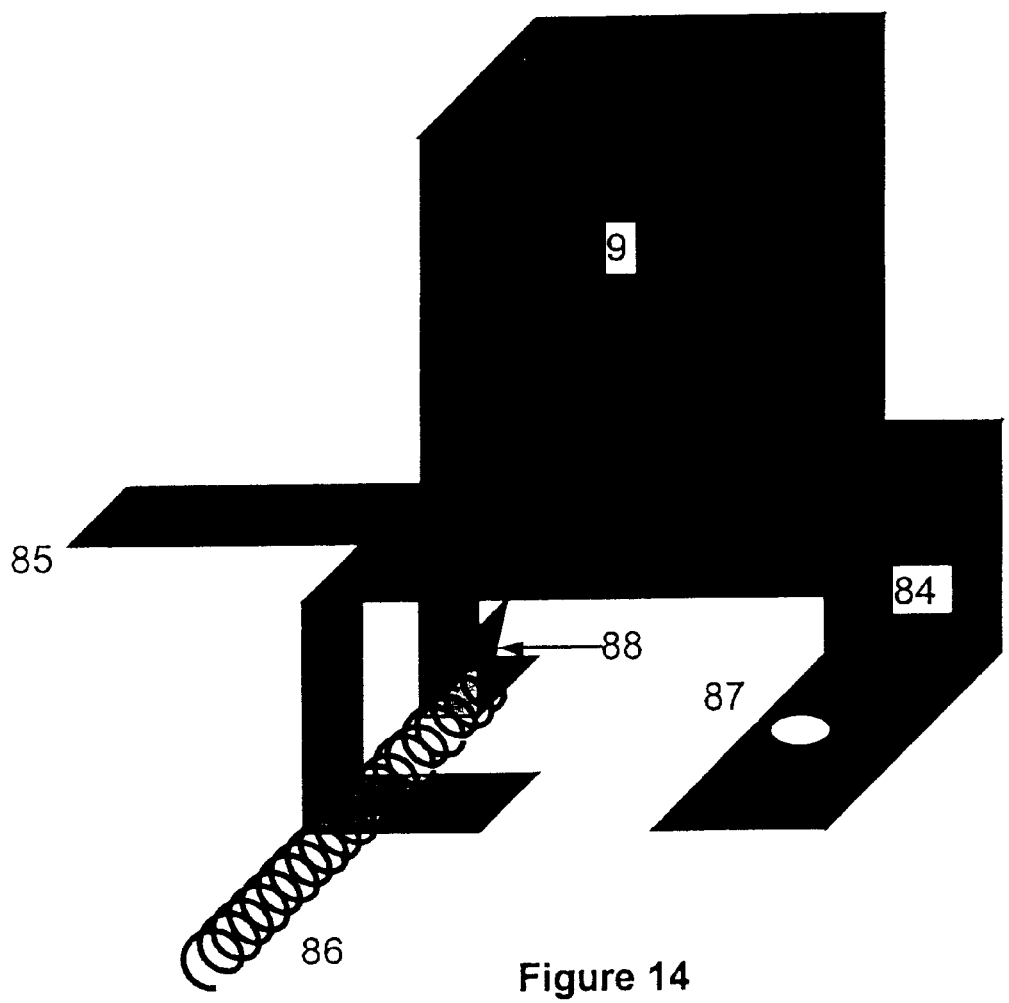
FIG. 14 illustrates a detailed view of the motor bracket layout.

FIG. 14 shows a detailed diagram of the motor area. DC motor 9 is mounted to bracket 84, having tab 85, which protrudes through slot 62 in chassis piece 60 (See FIG. 11). As shown on FIG. 10, motor shaft 92 is coupled to pinion 82, which meshes with spur gear 80. In a preferred embodiment, the required torque is in the range of 5 to 15 in-lbs., and preferably as in the exemplary embodiment 6 in-lbs. Pinion 82 is kept in contact with spur gear 80 by spring 86, which connects hook 88 and screw 77a. When the motor is turning, it rotates clockwise (when viewed from the top of the box), and the contact force generated between pinion 82 and spur gear 80 tends to cause the gear to rotate clockwise about its axis and bracket 84 to rotate clockwise about pivot 87 and stay in contact, instead of moving away. The motor can be disengaged by rotating the bracket counterclockwise by means of manually displacing tab 85. When tab 85 is released, spring 86 restores bracket 84 to a position wherein pinion 82 and gear 80 are meshed.

In sum, the above described embodiment provides a low power heating or cooling system control system that is operated by a DC power source. The control system provides improved error detection and display and can communicate with computers for data storage and error diagnosis. The above embodiment also provides a DC powered electrically operated zone valve, which detects valve position a priori without rotating the valve.

In an alternative embodiment, with minor reprogramming, the control system can also operate the components of a cooling system. Likewise, the zone valve used in the heating system can also function in a hydronic cooling mode or, when modified, can function as a zone damper, in a forced-air cooling system.

Additionally, in another alternative embodiment, the control system of the present invention can be easily adapted to other types of heating systems. For example, no reprogramming is necessary to use the control system of the present invention in a gas-fired forced-air heating system. However, greater power requirements of the blower used in a forced-air heating system in lieu of the circulator pump of the hydronic system may require additional power, provided for example, by additional batteries. Similarly, by replacing the boiler over temperature switch with a boiler over-pressure switch, eliminating the circulator pump, and selecting or modifying the zone valve components to withstand the higher circulating fluid temperature, the control system can also operate a low-pressure steam heating system.

In yet another embodiment, namely an oil-fired heating system, a burning oil mist is supplied to the boiler by the additional electrically powered system components of an oil supply pump, ignition transformer and air blower (all typically combined in a single device called an atomizing oil burner). In this embodiment, the control system described herein is modified by addition of a "fire-eye" flame sensor that shuts down the atomizing oil burner if the flame goes out, corresponding finctionally to the thermocouple-based pilot flame sensor of a gas valve, and a blocked-stack switch that is physically different from, but functionally equivalent to, the stack vent damper used with naturally vented gas-fired systems.

Each and every patent, patent application and publication that is cited in the foregoing specification is herein incorporated by reference in its entirety.

While the foregoing specification has been described with regard to certain preferred embodiments, and many details have been set forth for the purpose of illustration, it will be apparent to those skilled in the art that the invention may be subject to various modifications and additional embodiments, and that certain of the details described herein can be varied considerably without departing from the spirit and scope of the invention. Such modifications, equivalent variations and additional embodiments are also intended to fall within the scope of the appended claims.

What is claimed is:

1. A microprocessor-based, DC powered control system for heating or cooling system comprising an interconnected series of microprocessors, wherein the series of microprocessors comprises at least one of each of: thermostat microprocessor; zone valve microprocessor; and boiler circuit microprocessor,
   wherein the at least one thermostat microprocessor quantifies one or more room temperatures and one or more user-defined set temperatures in a zone, communicates the one or more room temperatures and the one or more user-defined set temperature to the at least one zone valve microprocessor, and sends the one or more room temperatures and the one or more user-defined set temperature to at least one boiler circuit microprocessor;
   wherein the at least one zone valve microprocessor controls position of at least one zone valve based on the one or more room temperatures and the one or more user-defined set temperatures, and sends information regarding the at least one zone valve position to the boiler circuit microprocessor; and
   wherein the at least one boiler circuit microprocessor operates at least one selected from the group consisting of a stack damper, circulator pump, and gas valve.

2. The control system according to claim 1 for a heating system.

3. The control system according to claim 2, wherein the heating system is a hydronic system.

4. The control system according to claim 2, wherein the heating system is a conventional home heating system.

5. The control system according to claim 1, wherein errors in the operation of the system are detected and displayed.

6. The control system according to claim 1, further comprising an indicator means by which the state of a valve is displayed.

7. The control system according to claim 1, wherein the boiler circuit microprocessor interfaces with a computer.

8. The control system according to claim 7, wherein the computer stores information on the temperature in each zone and the heating system power consumption.

9. The control system according to claim 1, wherein information is communicated between the microprocessors via data transmit and data receive lines.

10. The control system according to claim 7, wherein information is transmitted to an external device via the computer interface.

11. A microprocessor-based, DC powered control system for heating or cooling system comprising an interconnected series of microprocessors, wherein the series of microprocessors comprises at least one of each of: thermostat microprocessor; zone damper microprocessor; and furnace circuit microprocessor,
    wherein the at least one thermostat microprocessor quantifies one or more room temperatures and one or more user-defined set temperatures in a zone, communicates the one or more room temperatures and the one or more user-defined set temperature to the at least one zone damper microprocessor, and sends the one or more room temperatures and the one or more user-defined set temperature to at least one furnace circuit microprocessor;
    wherein the at least one zone damper microprocessor controls position of at least one zone damper based on the one or more room temperatures and the one or more user-defined set temperatures, and sends information regarding the at least one zone damper position to the furnace circuit microprocessor; and
    wherein the at least one furnace circuit microprocessor operates at least one selected from the group consisting of a stack damper, blower, and gas valve.

12. The control system according to claim 11 for a heating system.

13. The control system according to claim 12, wherein the heating system is a forced-air system.

14. The control system according to claim 12, wherein the heating system is a conventional home heating system.

15. The control system according to claim 11, wherein errors in the operation of the system are detected and displayed.

16. The control system according to claim 11, further comprising an indicator means by which the state of a valve is displayed.

17. The control system according to claim 11, wherein the furnace circuit microprocessor interfaces with a computer.

18. The control system according to claim 17, wherein the computer stores information on the temperature in each zone and the heating system power consumption.

19. The control system according to claim 11, wherein information is communicated between the microprocessors via data transmit and data receive lines.

20. The control system according to claim 17, wherein information is transmitted to an external device via the computer interface.

21. A method of controlling a heating system comprising:
    quantifying one or more room temperatures and one or more user-defined set temperatures in a zone through at least one thermostat microprocessor;
    communicating the one or more room temperatures and the one or more user-defined set temperatures to at least one separate zone valve microprocessor;

sending the one or more room temperatures and the one or more user-defined set temperatures to at least one boiler circuit microprocessor;

controlling at least one zone valve position based on the one or more room temperatures and the one or more user-defined set temperatures;

sending information regarding the at least one zone valve position to the boiler circuit microprocessor; and operating stack damper, circulator pump, and gas valve.

22. A method of controlling a heating system comprising:

quantifying one or more room temperatures and one or more user-defined set temperatures in a zone through at least one thermostat microprocessor;

communicating the one or more room temperatures and the one or more user-defined set temperatures to at least one separate zone valve microprocessor;

sending the one or more room temperatures and the one or more user-defined set temperatures to at least one boiler circuit microprocessor;

controlling at least one zone valve position based on the one or more room temperatures and the one or more user-defined set temperatures;

sending information regarding the at least one zone valve position to the boiler circuit microprocessor;

operating stack damper, circulator pump, and gas valve;

saving data of the one or more room temperatures and the one or more user-defined set temperatures;

detecting errors in one or more boiler components;

detecting errors in one or more zone valves;

displaying errors on one or more boiler audio-visual displays; and transmitting data to a computer.

23. The method according to claim 21, further comprising using a low-voltage DC power supply to operate the system.

24. A method of controlling a heating system comprising:

quantifying one or more room temperatures and one or more user-defined set temperatures in a zone through at least one thermostat microprocessor;

communicating the one or more room temperatures and the one or more user-defined set temperatures to at least one separate zone damper microprocessor;

sending the one or more room temperatures and the one or more user-defined set temperatures to at least one furnace circuit microprocessor;

controlling at least one zone damper position based on the one or more room temperatures and the one or more user-defined set temperatures;

sending information regarding the at least one zone damper position to the furnace circuit microprocessor; and operating stack damper, blower, and gas valve.

25. A method of controlling a heating system comprising:

quantifying one or more room temperatures and one or more user-defined set temperatures in a zone through at least one thermostat microprocessor;

communicating the one or more room temperatures and the one or more user-defined set temperatures to at least one separate zone damper microprocessor;

sending the one or more room temperatures and the one or more user-defined set temperatures to at least one furnace circuit microprocessor;

controlling at least one zone damper position based on the one or more room temperatures and the one or more user-defined set temperatures;

sending information regarding the at least one zone damper position to the furnace circuit microprocessor;

operating stack damper, blower, and gas valve;

saving data of the one or more room temperature and the one or more user-defined set temperatures;

detecting errors in one or more furnace components;

detecting errors in one or more zone dampers;

displaying errors on one or more furnace audio-visual displays; and transmitting data to a computer.

26. The method according to claim 24, further comprising using a low-voltage DC power supply to operate the system.

* * * * *